May 2, 1967   R. J. FREDERICKS   3,316,626
METHOD OF MAKING AN AIRFOIL SHAPED ELECTRODE
Filed Oct. 26, 1964

INVENTOR.
ROGER J. FREDERICKS
BY
McCormick, Paulding & Huber
ATTORNEYS

United States Patent Office 3,316,626
Patented May 2, 1967

3,316,626
METHOD OF MAKING AN AIRFOIL SHAPED ELECTRODE
Roger J. Fredericks, Harwinton, Conn., assignor to J. F. Fredericks Tool Company, Incorporated, West Hartford, Conn., a corporation of Connecticut
Filed Oct. 26, 1964, Ser. No. 406,303
5 Claims. (Cl. 29—423)

This invention relates to improvements in electrodes for electric discharge machining and more specifically to improvements in hollow electrodes for the electric discharge machining of precision airfoil shapes.

In electric discharge machining, particles are dislodged from a workpiece by a series of spark-over discharges from an electrode in a liquid dielectric medium. This spark-erosion action produces wear products which must be removed from the work area. The wear products removal problem is most critical in deep cavity machining. Consequently, in this type of operation it is customary to employ a hollow electrode through which the dielectric liquid may be pressure-circulated during machining to flush the wear products from the work cavity.

This electric machining process is capable of producing surface finishes which seldom require even finish polishing. However, to achieve such results, the electrode employed must present an uninterrupted surface free of surface breakthrough. Any interruption in the electrode surface produces a corresponding interruption in the spark gap, thereby failing to dislodge the metal particles at the associated point on the workpiece. A rough surface finish results.

The provision of satisfactory hollow electrodes for eroding precision airfoil-shaped cavities has proven problematical. An electrode formed from flat metal must have a seam. Since the electrode is gradually consumed in the machining process, a seam defect which may be extremely difficult to detect by inspection will become apparent in use, since an unsatisfactory work surface finish will be produced as the electrode is consumed. The extrusion of seamless airfoil-shaped electrodes has not proven feasible.

Accordingly, it is an object of this invention to provide a precision seamless hollow airfoil-shaped electrode for electric discharge machining.

It is further desired to provide an improved, highly efficient method for fabricating precision seamless hollow electrodes for electric discharge machining.

The drawing shows a preferred method of practicing the invention and such method will be described, but it will be understood that various changes may be made from the process disclosed, and that the drawing and description are not to be construed as defining or limiting the scope of the invention, the claims forming a part of this specification being relied upon for that purpose.

Figure 1:
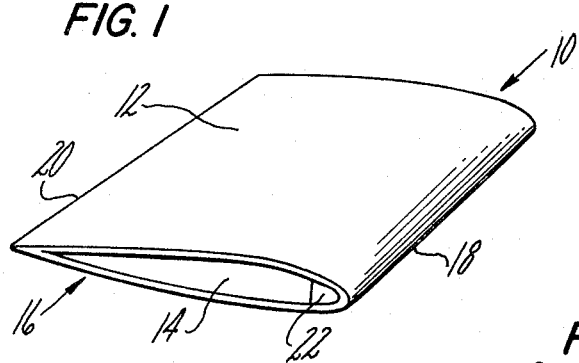
FIG. 1 is a perspective view of a typical airfoil-shaped electrode made in accordance with this invention.
Figure 2:
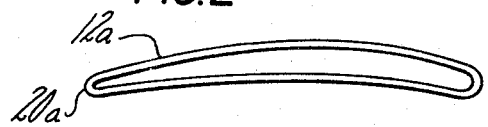
FIG. 2 is an end view of an electrode similar to the one shown in FIG. 1 but having a modified airfoil profile.

A very desirable electric discharge machining electrode that can be made according to the present invention is illustrated in FIG. 1, indicated as 10, and which comprises essentially a one-piece elongated seamless hollow shell 12 open at both ends and having an opening 14 extending longitudinally therethrough. The shell 12 has an airfoil profile cross-section 16 forming a leading edge 18 and a trailing edge 20. It will be noted that the shell 12 has a substantially uniform shape throughout its entire length. The illustrated electrode also has an elongated spar-like bar 22 positioned within the leading edge portion of the aperture 14 and extending therethrough. The bar 22 has a cross-section substantially complementing the leading edge cross-section of the opening 14 and is secured within the shell 12 by an appropriate metal fusion process such as brazing or welding.

Figure 3:
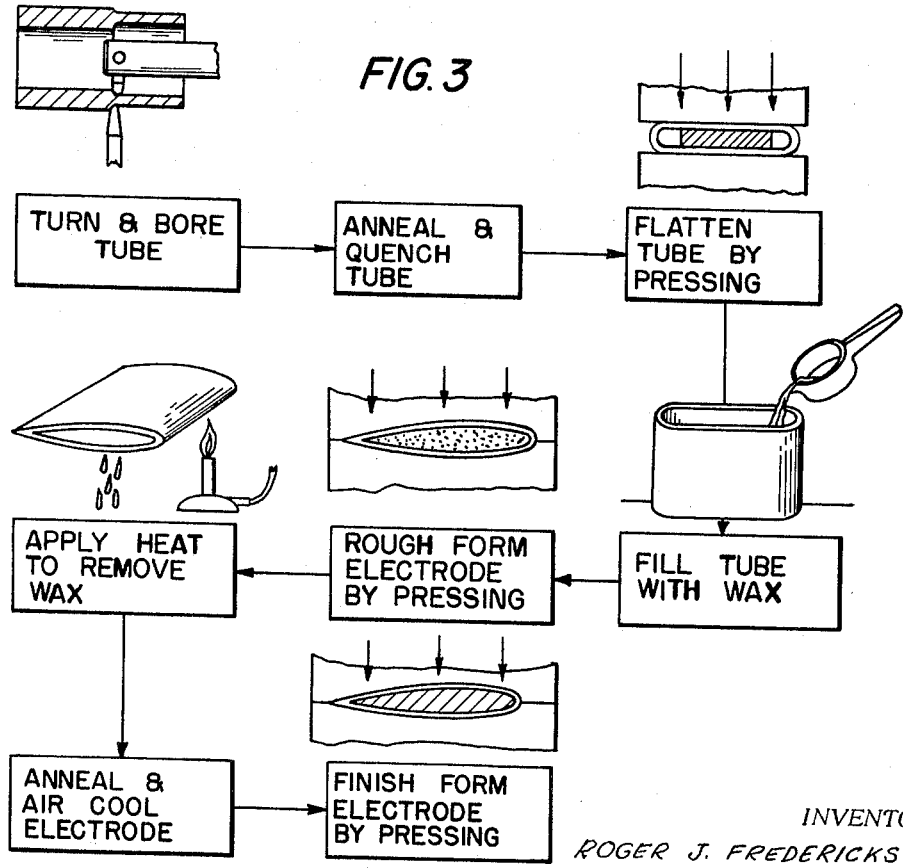
FIG. 3 is a flow chart showing the steps of making an airfoil in keeping with the invention.

The trailing edge 20 of the illustrated electrode 10 is acute, however, modifications of this electrode which are rounded at the trailing edge 20 are included within the scope of this invention. An airfoil profile of such a modified form omitting the bar 22 and having a rounded trailing edge 20a is shown in FIG. 3. In such a modification the thickness of the wall of the shell 12a is substantially uniform. Other modified forms of the electrode omitting the bar 22 are also within the scope of this invention.

A variety of materials are used to fabricate the electrodes for electric discharge machining, the nature of the electrode material being determined by the material to be machined, the wear ratio of the electrode material relative to the material machined being the determining factor. For purposes of present illustration, the method herein disclosed relates to the fabrication of an electrode from brass comprising approximately 70% copper, 30% zinc, which material is found to have a satisfactory wear ratio for employment in machining titanium alloys. However, it should be understood that the method provided by this invention is useful in fabricating electrodes from other materials. The annealing temperatures employed in performing the process hereinafter disclosed will, of necessity, vary with the physical properties of the electrode metal.

In FIG. 3, of the drawing, a process flow chart is shown outlining a method by which the product of the invention may be fabricated. The electrode is made from brass tubing having a circumferential dimension slightly greater than the peripheral dimension of the electrode 12 and a wall thickness and an overall length slightly greater than those of the electrode. In performing the process, a turning operation is employed to reduce the circumferential dimension of the tube to substantially equal the peripheral dimension of the airfoil section 16. The wall thickness of the tubing is reduced by boring to substantially equal the wall thickness of the required electrode. In the presently preferred method of practicing the invention the steps of turning and boring the tube are performed on a turret lathe in a single operation. A cutoff tool is employed in the same lathe setup to reduce the length of the tube to substantially equal the length of the required electrode.

The tube is next annealed and water quenched to prepare it for further forming operations. When the electrode material is brass comprising approximately 70% copper and 30% zinc, it has been found that an annealing operation in the range of 1100° to 1200° F. for one-half hour immediately followed by a water quenching satisfactorily prepares the material for forming. However, the annealing temperature is not critical and will vary with the physical properties of the material used in performing the process and the amount of forming necessary to produce the required shape.

An elongated mandrel having a rectangular cross-section is positioned within the tube passing therethrough with the longitudinal axis of the mandrel paralleling the tube axis. The tube is flattened with the mandrel therein by applying a uniform force along the length and perpendicular to the axis of the tube to deform the circular cross-section of the tube to a flattened or generally oblate circular cross-section. This operation would normally be performed by pressing in a hydraulic press or the like having a die set with parallel planar die surfaces. The object of this operation is to produce a flattened tube having a substantially uniform cross-section and a cross-sectional thickness dimension slightly greater than the profile thickness dimension of the required airfoil 10.

The tube is next filled with wax or some other generally similar semi-solid filler material which serves as an interior support for the tube wall during a subsequent forming operation. The tube is supported in an axially vertical position with its bottom end adjacent an appropriate flat horizontal surface so as to provide a closure for the bottom end of the tube. Molten wax is poured into the top end of the tube to fill the tube. Thereafter, the tube is allowed to air cool until the wax solidifies. The nature of the wax employed is not critical. Wax of the ordinary household variety obtainable at most food stores has proven satisfactory in the performance of this process.

The wax-filled tube is further formed by pressing it in a die set having a die recess proportionately complementing the shape of the required electrode 10 and having recess cross-sectional dimensions slightly greater than the associated dimensions of the required electrode. The pressing operation is normally performed in a hydraulic press or the like. In the presently preferred method of practicing the invention, the die set employed in this rough finishing operation has a die recess with cross-sectional dimensions in the range of .010 to .015 inch greater than the associated nominal dimensions of the required airfoil profile.

After completion of this rough forming operation, the tube, which has been deformed to roughly conform with the contour of the required electrode, will hereinafter be referred to as the electrode.

The wax is removed from the electrode by heating the electrode with a torch and allowing the wax to flow therefrom.

An annealing operation at approximately 1300° F. for one-half hour prepares the electrode for further forming. The electrode is allowed to air cool after this and any subsequent annealing steps that may be required.

The finish forming operation is performed in a die set having a recess therein substantially complementing the size and shape of the required electrode. An airfoil-shaped mandrel is extended through and positioned within the recess 14 of the electrode 10 during the finish forming operation. The cross-section of the finishing mandrel substantially complements the airfoil shape cross-section of the recess 14 in the required electrode 10.

It should be understood that it may be necessary to perform additional alternate steps of rough forming and annealing between the final steps of annealing and finish forming aforedescribed. The nature of the material from which the electrode is fabricated and the contour of the required airfoil section are factors in determining the necessity for these additional steps. It should also be understood that cleaning operations may also be necessary at various stages of the process to remove oil film or annealing scale from the electrode as is well known to those familiar with the metal forming art. In the aforedescribed process a vapor degreaser is employed to remove the oil film, whereas muriatic acid is employed for scale removal.

Precision seamless hollow airfoil-shaped electrodes with acute leading or trailing edge sections may be formed by the aforedescribed method without surface breakthrough conditions occurring at the acute edge portions. However, I have found that the quality of such electrodes can be materially improved without affecting the machining capability of the electrode by filling the recess 14 adjacent the acute edge portion with fusible metal to strengthen the edge portion. This operation is performed in the following manner.

The electrode is supported with the trailing edge in a downward position generally paralleling the horizontal. Silver solder wire or other appropriate fusible metal in wire or rod form is positioned within the recess 14 extending through it adjacent the trailing edge portion 20. The trailing edge portion 20 is uniformly heated with a torch or other means to achieve uniform disposition of the fusible metal within the recess 14 adjacent the trailing edge 20.

In like manner, the bar 22 is brazed or otherwise fused into the recess 14 adjacent the leading edge 18. I have found that a superior bond may be achieved between the elongated bar 22 and the surface of the recess 14 if the bar is slidably moved upon the surface of the recess 14 adjacent the leading edge 18 with a slight reciprocating motion as a uniform heat is applied to the leading edge to fuse the bonding metal. After a few such reciprocating motions the bar 22 is positioned within the electrode 10 and the heat source removed from the leading edge 18 to allow the mating parts to fuse.

The invention claimed is:

1. A method for manufacturing a hollow shell electrode with an airfoil section for electric discharge machining, said method comprising the steps of providing a tube having a circumferential dimension substantially equal to the desired peripheral dimension of said airfoil section and having a wall thickness substantially equal to the desired wall thickness of said hollow electrode, flattening the circular cross-section of said tube to a generally oblate cross-section which is slightly thicker than the desired profile thickness dimension of said airfoil section, filling the interior of said tube with wax, rough forming said tube by pressing to approximate said airfoil section with said wax therein, removing said wax from said electrode so formed, positioning a mandrel within said electrode parallel to the axis thereof and extending therethrough, and finish forming said electrode by pressing said electrode to the contour of said airfoil section with said mandrel therein.

2. A method for manufacturing a hollow shell electrode with an airfoil section for electric discharge machining, said method comprising the steps of providing a tube having a circumferential dimension substantially equal to the desired peripheral dimension of said airfoil section and having a wall thickness substantially equal to the desired wall thickness of said hollow electrode, annealing said tube, quenching said tube in water immediately after annealing, pressing said tube to flatten the circular cross-section thereof, filling said tube with wax, rough forming said tube section to approximately said airfoil section by pressing said tube with said wax therein, removing said wax from said electrode so formed, positioning a mandrel within said electrode parallel to the axis thereof and extending therethrough, and finish forming said electrode by pressing said electrode to the contour of said airfoil section with said mandrel therein.

3. A method for manufacturing a hollow shell electrode for electric discharge machining, said method comprising the steps of turning the outside circumference of a tube to a circumferential dimension substantially equal to the peripheral dimension of said airfoil section, boring said tube to reduce the wall thickness thereof to substantially equal the wall thickness of said hollow electrode, annealing said tube, water quenching said tube immediately after annealing, pressing said tube to deform the circular cross-section thereof to a generally oblate circular cross-section which is slightly thicker than the desired profile thickness of said airfoil section, supporting said tube in an axially vertical position and closing the bottom end thereof, pouring molten wax into said tube to fill said tube therewith, cooling said tube in air to allow said wax to solidify therein, forming said tube with said wax therein by pressing said tube in a die set having a recess defined therein substantially proportional to said airfoil section, said recess in said die set having dimensions 0.010 to 0.015 inch greater than the associated dimensions of said airfoil section, removing said wax from said electrode so formed by heating said electrode, annealing said electrode, cooling said electrode in air, positioning an airfoil-shaped mandrel within said electrode parallel to the axis thereof and extending therethrough, and forming said electrode with said mandrel therein by pressing said electrode in a die set having an airfoil-shaped recess defined therein substantially complementing the contour of said airfoil section.

4. A method for manufacturing a hollow shell electrode with an airfoil section having a leading edge portion and a trailing edge portion, said method comprising the steps of providing a tube having a circumferential dimension substantially equal to the peripheral dimension of said airfoil section and having a wall thickness substantially equal to the desired wall thickness of said hollow electrode, annealing and quenching said tube, pressing said tube to deform the circular cross-section thereof to a generally oblate circular cross-section slightly thicker than the desired profile thickness of said airfoil section, filling said tube with wax, pressing said tube to the rough form of said airfoil section, removing said wax from said electrode so formed, pressing said electrode to the general contour of said airfoil section with a mandrel therein, positioning an elongated sparlike bar having a cross-section substantially complementary to the interior surface contour of said leading edge portion within said leading edge portion, heating said leading edge portion substantially uniformly for securing said bar therein by a metal fusion process, reciprocally moving said bar relative to said leading edge portion with said complementary surfaces in slidable engagement during a portion of said metal fusion process, and finish forming said electrode by pressing said electrode with a mandrel therein.

5. The method defined in claim 4 further characterized by the additional steps of positioning a fusible metal rod within said hollow electrode adjacent said trailing edge portion, heating said trailing edge portion substantially uniformly to bond said fusible metal thereto, said additional steps being performed between the step of pressing said electrode to the general contour of said airfoil section and the step of finish forming said electrode.

References Cited by the Examiner

UNITED STATES PATENTS

| | | | |
|---|---|---|---|
| 2,300,353 | 10/1942 | Eberhardt | 29—423 |
| 3,010,353 | 11/1961 | Roehr | 29—423 |
| 3,052,961 | 11/1962 | Sherman | 29—156.8 |
| 3,091,023 | 5/1963 | Carlson | 29—423 X |
| 3,107,416 | 10/1963 | Horne | 29—156.8 |
| 3,214,805 | 11/1965 | McKenica | 29—423 X |
| 3,247,579 | 4/1966 | Cattermole et al. | 29—423 X |

JOHN F. CAMPBELL, *Primary Examiner.*

P. M. COHEN, *Assistant Examiner.*